(12) United States Patent
Guering

(10) Patent No.: US 9,114,880 B2
(45) Date of Patent: Aug. 25, 2015

(54) AIRCRAFT SEAT BACK WITH IMPROVED COMFORT AND REDUCED SIZE

(71) Applicant: AIRBUS OPERATIONS (S.A.S.), Toulouse (FR)

(72) Inventor: Bernard Guering, Montrabe (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 14/090,882

(22) Filed: Nov. 26, 2013

(65) Prior Publication Data
US 2014/0159450 A1    Jun. 12, 2014

(30) Foreign Application Priority Data

Nov. 28, 2012    (FR) ...................................... 12 61341

(51) Int. Cl.
| | |
|---|---|
| B60N 2/24 | (2006.01) |
| B64D 11/06 | (2006.01) |
| A47C 7/40 | (2006.01) |
| B60N 2/64 | (2006.01) |
| B60N 2/68 | (2006.01) |
| A47C 7/44 | (2006.01) |

(52) U.S. Cl.
CPC ................ B64D 11/06 (2013.01); A47C 7/405 (2013.01); A47C 7/445 (2013.01); B60N 2/643 (2013.01); B60N 2/68 (2013.01); B64D 11/0649 (2014.12)

(58) Field of Classification Search
CPC .... B64D 11/06; B64D 11/0649; B60N 2/643; B60N 2/68; A47C 7/445; A47C 5/06; A47C 7/405; A47C 7/024; A47C 7/16; A47C 7/28
USPC ...................... 297/301.1, 285, 284.3, 452.63; 244/118.6
See application file for complete search history.

(56) References Cited

U.S. PATENT DOCUMENTS

| | | | | |
|---|---|---|---|---|
| 1,011,026 | A | * | 12/1911 | Carpenter ................ 297/452.29 |
| D149,798 | S | * | 6/1948 | Crawford ....................... D6/374 |
| 3,675,880 | A | | 7/1972 | Koch |
| 5,195,804 | A | * | 3/1993 | Stolle et al. .............. 297/452.33 |
| 5,314,143 | A | | 5/1994 | Luria |
| 5,544,842 | A | | 8/1996 | Smith |
| 6,305,643 | B1 | | 10/2001 | Sankrithi |
| 6,454,208 | B1 | | 9/2002 | Nervig et al. |

(Continued)

FOREIGN PATENT DOCUMENTS

| | | |
|---|---|---|
| EP | 1 693 248 | 8/2006 |
| FR | 2 900 634 | 11/2007 |

(Continued)

OTHER PUBLICATIONS

French Search Report for FR 1261341 dated Oct. 2, 2013.

(Continued)

Primary Examiner — Milton Nelson, Jr.
(74) Attorney, Agent, or Firm — Jenkins, Wilson, Taylor & Hunt, P.A.

(57) ABSTRACT

The invention relates to a seat back for an aircraft comprising a structural column bearing a plurality of devices for supporting an occupant of the seat, these devices being distributed along the structural column and oriented transversely relatively to the structural column so as to each protrude on either side of this column. This solution can reduce the mass and dimensions, while providing satisfactory comfort for the occupant.

11 Claims, 4 Drawing Sheets

(56) References Cited

U.S. PATENT DOCUMENTS

| | | | |
|---|---|---|---|
| 6,464,169 B1 | 10/2002 | Johnson et al. | |
| 6,910,736 B2 * | 6/2005 | White | 297/284.3 |
| 7,320,503 B2 * | 1/2008 | Eysing | 297/452.63 |
| 7,784,871 B2 * | 8/2010 | Cochran | 297/338 |
| 7,909,402 B2 * | 3/2011 | Chu et al. | 297/284.3 |
| 2004/0256899 A1 * | 12/2004 | Moore et al. | 297/284.3 |
| 2005/0133308 A1 | 6/2005 | Reysa et al. | |
| 2005/0230540 A1 | 10/2005 | Harrington et al. | |
| 2006/0255635 A1 * | 11/2006 | Iijima et al. | 297/284.3 |
| 2007/0164152 A1 | 7/2007 | Anderson et al. | |
| 2008/0149769 A1 | 6/2008 | Koch et al. | |
| 2009/0294394 A1 | 12/2009 | Girlich | |
| 2010/0050803 A1 | 3/2010 | Stamate | |
| 2010/0140397 A1 | 6/2010 | Wassenhove | |
| 2010/0308166 A1 | 12/2010 | Bovelli | |
| 2013/0112808 A1 | 5/2013 | Guering | |
| 2014/0168907 A1 | 6/2014 | Guering | |

FOREIGN PATENT DOCUMENTS

| | | |
|---|---|---|
| FR | 2 910 875 | 7/2008 |
| FR | 2 939 766 | 6/2010 |
| GB | 2 131 779 | 11/1983 |
| WO | WO 02/102203 | 12/2002 |
| WO | WO 2006/101417 | 9/2006 |
| WO | WO 2010/069923 | 6/2010 |
| WO | WO 2012/095605 | 7/2012 |
| WO | WO 2012/110725 | 8/2012 |
| WO | WO 2012/149978 | 11/2012 |

OTHER PUBLICATIONS

French Search Report for Application No. FR 1151346 dated Sep. 12, 2011.

International Search Report for Application No. PCT/FR2012/050064 dated Apr. 18, 2012.

Preliminary Search Report for Application No. FR 1262067 dated Aug. 9, 2013.

Preliminary Search Report for Application No. FR 1262144 dated Sep. 2, 2013.

International Search Report and Written Opinion for Application No. PCT/FR2012/050189 dated Jan. 10, 2014.

Non-Final Office Action for U.S. Appl. No. 14/090,882 dated Dec. 18, 2014.

* cited by examiner

AIRCRAFT SEAT BACK WITH IMPROVED COMFORT AND REDUCED SIZE

TECHNICAL FIELD

This invention relates to the field of aircraft seats, particularly seats fitted in the passenger compartment of commercial aircraft, this compartment usually being called the aircraft "cabin".

The invention relates more particularly to an improvement to the design of the back of aircraft seats.

BACKGROUND

In existing aircraft, seat backs have a structural part, for example in the form of a frame, onto which many elements such as cushions are added, designed to make the occupants of these seats more comfortable. For example, such a commercial aircraft seat is described in document US 2010/0308166.

This design, although widespread, has a large mass and size, particularly due to the large volume of the structural part. The comfort of the occupant also has to be optimized. In this respect, in particular there is a need for a more uniform resistance to pressure applied by the occupant on the seat back.

SUMMARY

Therefore, the purpose of the invention is to at least partially correct the disadvantages mentioned above applicable to embodiments according to prior art.

To achieve this, the subject of the invention is firstly an aircraft seat back comprising a structural column with a plurality of seat occupant support devices, said support devices being distributed along the structural column and oriented transverse to the column so that they protrude from each side of this column.

Furthermore, the attachment means comprise a plurality of segments capable of pivoting relative to each other, including a central segment mounted on the structural column so as to pivot relative to it, said support means also comprising two lateral segments mounted at the two opposite ends of the central segment, capable of pivoting relative to the central segment. Finally, each support device is sufficiently flexible so that it can deform elastically under the effect of the pressure of an occupant's back leaning on the seat back.

The disclosed invention is a breakthrough from previous aeronautical designs, this breakthrough results particularly from the use of a column shaped structural part of the seat back, like a backbone. This design can reduce the mass and dimensions, the dimensions being reduced particularly on both sides of the structural column, advantageously resulting in space saving for the legs of the occupant behind this seat.

Furthermore, the increased number of the occupant support devices contributes to improved comfort because each device added to the structural column can thus locally match the topology, namely the relief of the occupant's back. The result is a more uniform resistance of pressure applied by the occupant on the seat back.

Furthermore, segmentation of comfort elements of the back, in other words support devices, helps to improve aeration and consequently limits risks of perspiration due to the local warm spots. This segmentation also reduces the global mass of the seat back. The above-mentioned advantages are even more significant when said support devices are at a spacing from each other along the structural column. In such a preferred configuration, spaces between support devices are left free and are therefore visible from outside the seat. Alternately, at least some of these spaces may be functionalised, for example by installing vibrating elements for providing a back massage.

As mentioned above, the seat back comprises means of attachment of this device on the structural column associated with each support device. Therefore, the support devices can be replaced independently of each other, for cost saving.

Furthermore, the increased number of segments helps to get a better match to local topology. With the proposed embodiment, each support device can deform in many ways depending on the force applied by the occupant, this deformation along the device possibly being in the shape of a curve, or even two inverted curves to result in an inflection point. In this case, each device is free to deform, accompanying the occupant's torsion movements. In particular this is possible due to at least one of the segments of the attachment means being sufficiently flexible to deform under the force applied by an occupant sitting in the seat.

Preferably, each of the lateral segments is mounted on the associated support device through its two opposite ends, the two opposite ends of each lateral segment preferably being capable of pivoting about the support device.

In this respect, note that pivot functions are preferably obtained by pivot connections or articulations, but other similar means may be adopted such as flexible links, for example elastomer links. Pivot pins forming part of these attachment means are preferably all approximately parallel.

Preferably, the attachment means of each support device are usually convex towards the back, these means preferably being fixed between the column and the occupant support devices. Consequently, starting from the structural column and on both sides of it, the back extends laterally and forwards, which frees even more room for the legs of the occupant behind the seat.

Preferably, all segments of attachment means of a support device are located approximately in the same plane, which is preferably approximately locally orthogonal to the structural column. Furthermore, segment pivot pins are also approximately orthogonal to this plane.

Preferably, each support device is in the form of a transverse lath. Therefore this lath is capable of deforming elastically to match the pressure applied by the occupant's back.

Preferably, each transverse lath comprises a foam portion, preferably surrounding a core of the lath.

Preferably, the laths form the outside surface of the seat back with which the seat occupant will come into contact. A cover could also be provided over all these laths without going outside the scope of the invention.

Very preferably for comfort reasons, each support device is sufficiently flexible so that it can deform elastically under the effect of the pressure applied by the back of an occupant leaning on the seat back.

Finally, said support devices preferably do not have any direct contact with said structural column, because they are separated from it by said attachment means. Consequently, the occupant's back is at a distance from the structural column and comfort is improved. Spacing of the support devices also gives greater freedom of deformation, particularly during torsion movements of the back.

Another purpose of the invention is an aircraft seat comprising a seat back as disclosed above.

Another purpose is an aircraft comprising at least one such seat which is preferably a cabin seat for the passenger compartment of the aircraft.

Other advantages and characteristics of the invention will become clear after reading the non-limitative detailed description given below.

BRIEF DESCRIPTION OF THE DRAWINGS

This description will be made with reference to the appended drawings among which.

DETAILED DESCRIPTION

Figure 1:
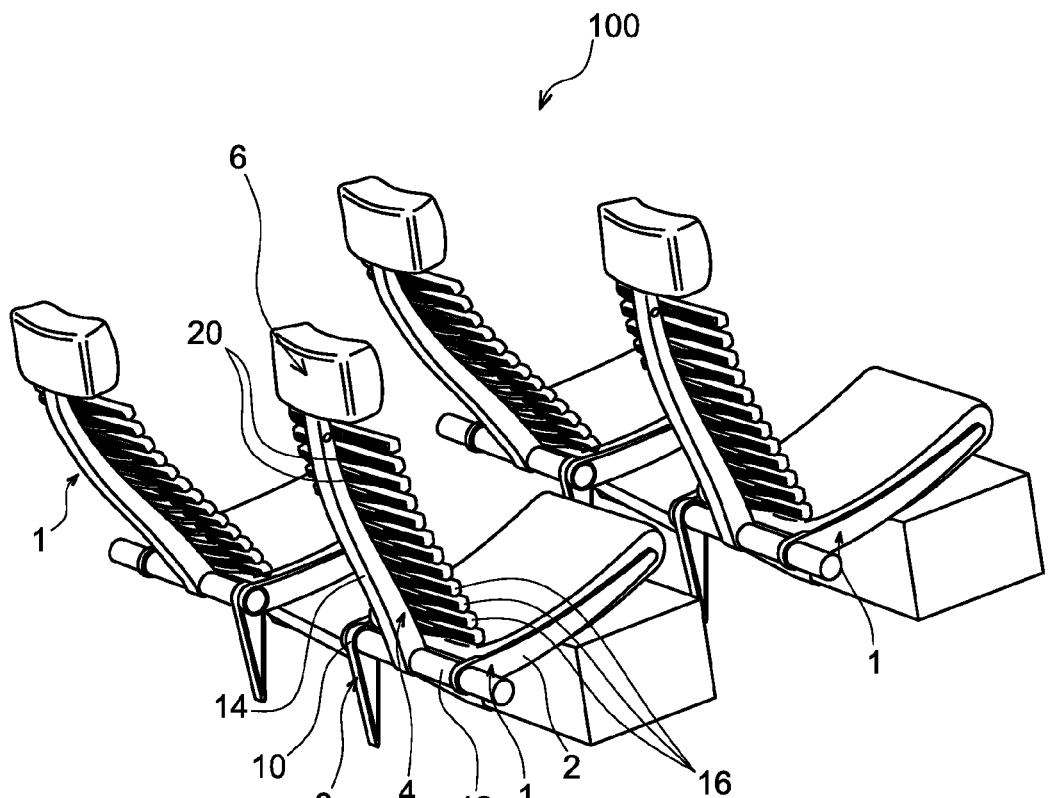
FIG. 1 shows a perspective view of a part of a passenger compartment in a commercial aircraft, the compartment being fitted with cabin seats according to a preferred embodiment of the invention.
Figure 2:
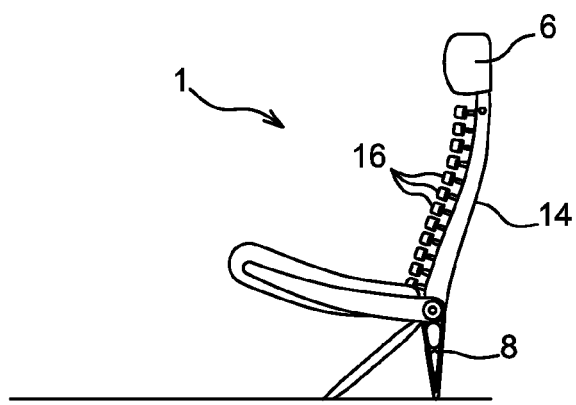
FIG. 2 shows a side view of one of the seats shown in FIG. 1.

With reference firstly to FIG. 1, the figure shows part of a passenger compartment 100 of a commercial aircraft fitted with cabin seats 1 according to this invention. The seats 1 are arranged conventionally in rows.

Each seat 1 comprises a seat 2, a seat back 4, a headrest 6 and means 8 of fixing the seat onto the floor of the cabin compartment. The seat 2 and the headrest 6 have conventional shapes.

The means 8 comprise stands 10 that will be connected to floor rails, and a transverse shaft 12 carried by the stands 10 and on which the seat 2 is hinged, so that the back can be rotated about the axis of this shaft. The back 4 is fixed to the shaft 12. It comprises a structural column 14 extending approximately in the vertical direction from the shaft 12, from a central zone of the shaft. These two elements can be added one onto the other or can be made from a single piece, preferably a metallic material or composite material. Another possibility would be to make the shaft 12 fixed to the seat 2 and to make the lower end of the column 14 hinged on this shaft 12, so that the seat back can be rotated about the axis of the shaft 12, relative to the seat.

Globally, the seat back 4 comprises the structural column 14 to the end of which the headrest 6 is fitted, together with the occupant support devices 16, and finally the means 20 of fastening these devices to the column 14 forming the frame of the seat back. The seat back 4 has a generally skeleton type shape, completely different from aircraft seats designed according to prior art.

The section of the structural column 14 is closed, and for example may be square or rectangular, possibly with rounded edges. Nevertheless, other open sections may be envisaged, for example a U-shape. The column 14 is generally curved in shape, possibly double curved as shown in FIG. 1, to follow the shape of the back of the occupant sitting in the seat.

The back 4 of the seat 1 will now be described in more detail with reference to FIGS. 1 to 5.

Firstly, the general skeleton shape is obtained using support devices 16 arranged transverse to the column 14 on which they are mounted, protruding from each side of it, preferably symmetrically about the column. Each device 16 is preferably in the form of an elongated element extending transversely made with one or several nested bodies, and in this case resembling a lath. The section of this lath 16 may have different shapes, for example approximately square or approximately rectangular, and possibly with rounded edges.

According to one example embodiment, the ratio between the length and the width of the flexible lath is between 5 and 20. The laths 16 are distributed along the column 14 but do not come into direct contact with it because the attachment means 20 are inserted between them. As can be seen in the above mentioned figures, the laths 16 in front of the column forming the rear part of the seat back, are at a spacing from each other along the column. They are parallel to each other and parallel to the lower edge of the headrest and the edge of the seat.

The spaces between laths may extend over a height of between 0.3 and 3 times the height of the laths. These inter-lath spaces are preferably retained in the final state of the seat to help to aerate the seat back, and they can be seen from outside the seat unless a seat cover is provided to cover the assembly. Alternately, these spaces could include elements with different functions (not shown), for example vibrating elements for massaging the back of the occupant sitting in the seat 1.

Figure 4:
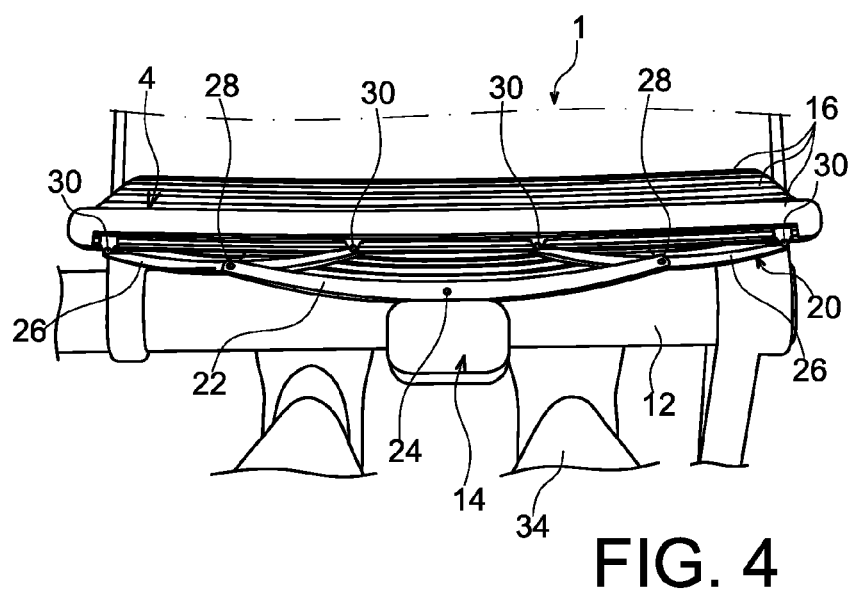
FIG. 4 shows a top view of the seat shown in FIGS. 2 and 3.

As can be seen better in FIG. 4, attachment means of each lath 16 onto the column 14 are in the form of a plurality of articulated segments, preferably also metallic or made of a composite material. The segment articulations are designed to accompany deformation of the laths 16 that are sufficiently flexible to be able to deform elastically under the pressure of the back of an occupant sitting in the seat and leaning on the seat back. This deformation of the lath 16 means that the lath can match the shape of the occupant's back.

In this case, the segments are preferably all arranged in a single plane, preferably locally orthogonal to the column 14, the plane in which the associated lath 16 is also located.

Among these segments, there is a central segment 22 convex backwards, for which the median zone is free to pivot on the column 14 through a pivot link 24. For example, the central segment 22 is in the form of an arc of a circle. There are two lateral segments 26 allowed for at the opposite ends of this segment 22, each also convex facing backwards, and the median zone of which is free to pivot about its end associated with segment 22, through a pivot link 28. In this case also, each lateral segment 26 is in the form of an arc of a circle, preferably with a radius of less than the radius of segment 22.

The two opposite ends of each of the lateral segments 26 are mounted on the associated lath 16, also free to pivot relative to the pivot link 30. Consequently, there are four pivot links 30, all arranged along a line transverse to the single plane passing through the attachment means 20, the spacing between the two links furthest apart from each other being approximately equal to or slightly less than the width of the seat back.

With this configuration, the attachment means 20 formed by assembling the segments 22, 26 adopt a generally convex shape facing backwards, with a median part that is the part that protrudes furthest back due to symmetry about the column 14 in front of which these means are articulated through the link 24. Consequently, starting from the structural column 14 and on both sides of it, the seat back 4 extends laterally forwards as can be seen better in FIG. 4, which contributes to releasing a large amount of space for the legs 34 of the occupant located behind the seat 1.

The rotation axes of the pivot links 24, 28, 30 are preferably parallel and orthogonal to the single plane. Consequently, in response to efforts applied by the occupant on the seat back, the articulated segments 22, 26 will displace by pivoting within this single plane, passing through the associated lath 16. During this load application, at least some of the segments 22, 26 may also deform elastically, even if their flexibility is preferably much less than the flexibility of laths, which are designed to deform much more easily to match the relief of the occupant's back. In this description, deformation refers to the change in the linear shape of the elements concerned, which may be curved, or the curve may be accentuated, or flattened, or even a double curvature can be applied to the lath, as will be explained below.

Figure 3:
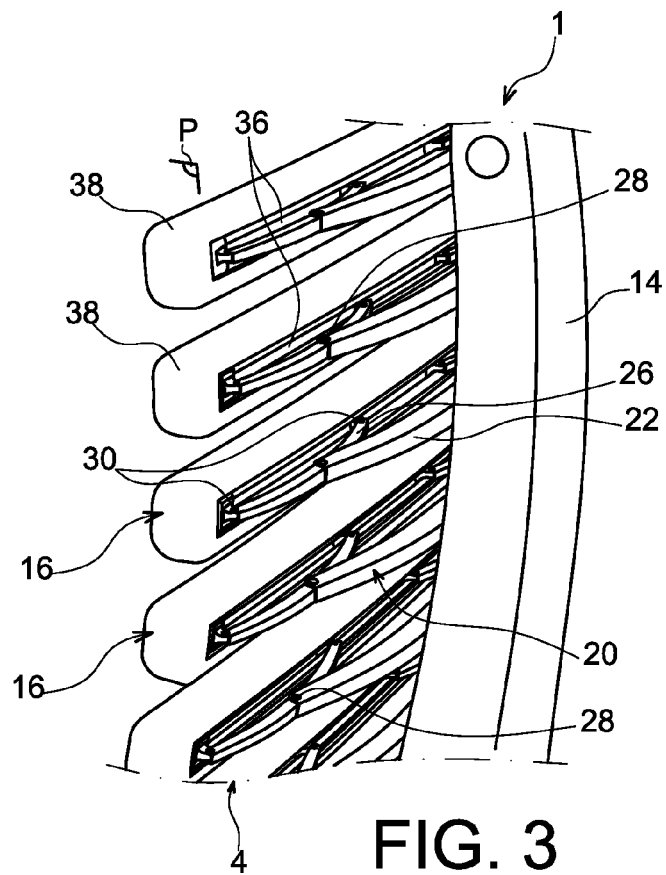
FIG. 3 shows an enlarged perspective view of a part of the back of the seat in FIG. 2.
Figure 5:
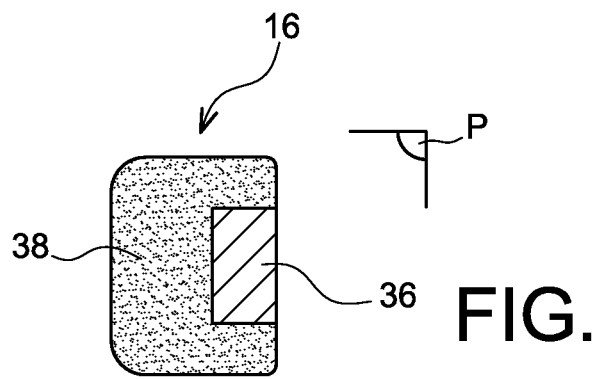
FIG. 5 is a sectional view taken along plane P in FIG. 3.

With reference more specifically to FIGS. 3 and 5, note that each lath 16 that is not necessarily made of wood, may have an inner core 36 on which the lateral segments 26 are articulated, the core being covered with a foam portion 38 increasing the occupant's comfort. The core 36 may be made of aluminum or one of its alloys or even carbon fiber. A titanium or steel solution is also possible without going outside the scope of the invention. The foam portion 38 thus acts as cladding for the seat back. In this case, the outside surface of the seat back with which the occupant will come into contact is thus formed by this portion of foam 38 covering the core 36 over the entire length of the lath, along the transverse direction of the seat back.

Figure 6A:
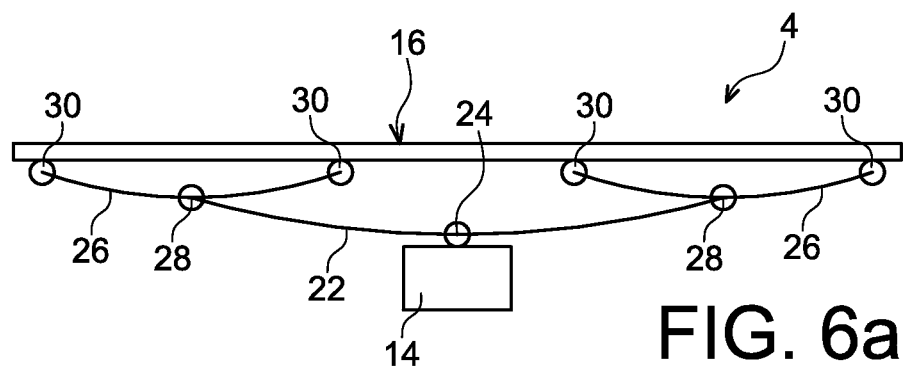
FIGS. 6a to 6e diagrammatically show a top view of one of the laths of the seat back according to different configurations as a function of the pressure applied by the occupant.

FIG. 6a shows a diagrammatic view of one of the laths 16 in the unstressed state, as also shown in the previous figures.

Figure 6B:
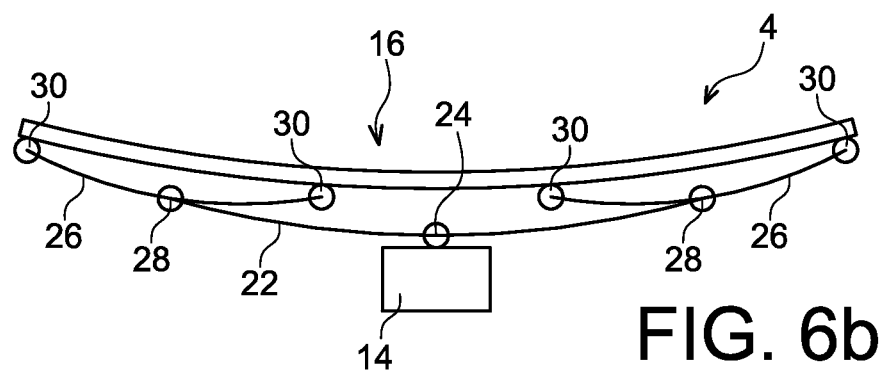

FIG. 6b shows a deformation of the lath 16 in a conventional configuration in which the occupant is sitting on the seat 1, remaining centered relative to the column 14. In this case, the approximately straight shape of the unstressed lath is deformed to become curved towards the back. This deformation of the linear shape of the lath is made possible by symmetric pivoting of the two lateral segments 26, the central segment 22 remaining fixed relative to the column.

Figure 6C:
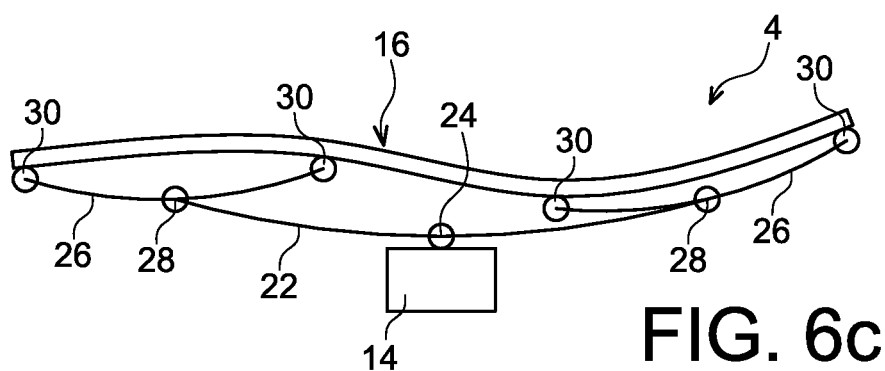

FIG. 6c shows a case of torsion of the occupant's back, observed particularly when the occupant turns his or her head sideways or backwards. This causes a double curvature on the lath 16 with an inflection point 40 between the two inverted curvatures in the shape of an elongated S. This inverted curvature advantageously takes place without any discomfort for the occupant, because the lath 16 is preferably not in contact with the column, and it can deform freely accompanying the occupant's torsion movement without ever bearing on this column. This deformation of the linear shape of the lath is made possible by the non-symmetric pivoting of the two lateral segments 26, the central segment 22 being able to remain fixed relative to the column.

Figure 6D:
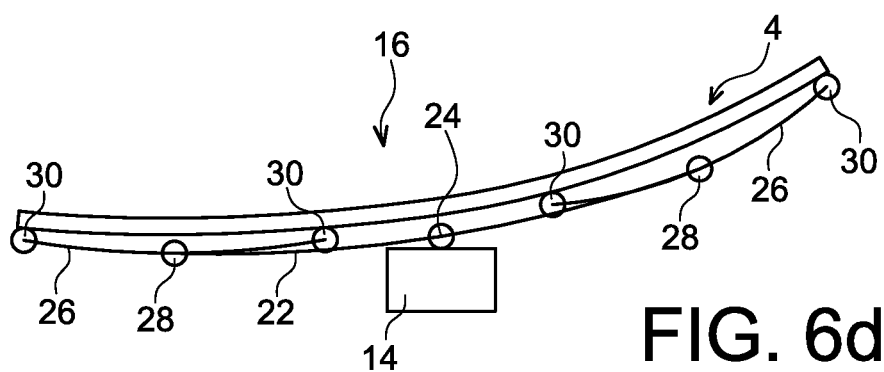
Figure 6E:
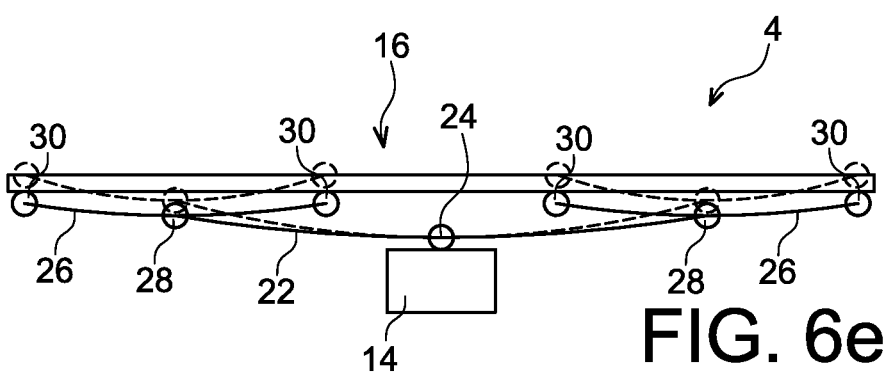

FIG. 6d shows a deformation of the lath 16 in a configuration in which the occupant sitting in seat 1 is not centered on it, but is slightly offset towards the left of the seat back from the column 14. In this case, the approximately straight shape of the unstressed lath is deformed to be curved towards the back and towards the right. This deformation in the linear shape of the lath is possible due to the non-symmetric pivoting of the two lateral segments 26, and by pivoting of the central segment 22 about its link 24 with the column. Finally, FIG. 6e diagrammatically shows that if the force applied by the occupant on the seat back is high, the segments 22, 26 can also deform by flattening, the dashed lines in this figure corresponding to their more curved and unstressed state.

FIGS. 6a to 6e show different possible behaviors for a lath, it being understood that the laths 16 in a single seat back 4 and their attachment means 20 may have different flexibilities optimized for the part of the back to be supported.

Obviously, those skilled in the art can make various modifications to the invention as disclosed above, solely as non-limitative examples. In particular, an embodiment is described in which the attachment means comprise three articulated segments, but a larger number of segments would be possible, particularly to obtain greater freedom of deformation for occupant support devices.

The invention claimed is:

1. An aircraft seat back comprising:
   a structural column with a plurality of seat occupant support devices, the support devices being distributed along the structural column and oriented transverse to the column so that they protrude from each side of the column; and
   an attachment structure associated with each support device and on the structural column;
   wherein the attachment structure comprises a plurality of segments pivotably movable relative to each other, including a central segment mounted on the structural column, so as to pivot relative to it, the attachment structure also comprising two lateral segments mounted at the two opposite ends of the central segment, pivotably movable relative to the central segment, and each support device being sufficiently flexible so that it is deformable elastically under an effect of pressure of an occupant's back leaning on the seat back.

2. The seat back according to claim 1, wherein each of the lateral segments is mounted on the associated support device through its two opposite ends, the two opposite ends of each lateral segment being capable of pivoting about the support device.

3. The seat back according to claim 1, wherein at least one of the segments of the attachment structure is sufficiently flexible to be deformable under force applied by the occupant sitting in the seat.

4. The seat back according to claim 1, wherein the attachment structure of each support device is rearwardly convex towards the structural column.

5. The seat back according to claim 1, wherein all segments of the attachment structure of the support device are located approximately in a same plane.

6. The seat back according to claim 1, wherein the support devices are at a spacing from each other along the structural column.

7. The seat back according to claim 1, wherein the support devices do not have any direct contact with the structural column.

8. The seat back according to claim 1, wherein each support device is in the form of a transverse lath.

9. The seat back according to claim 8, wherein each transverse lath comprises a foam portion surrounding a core of the lath.

10. An aircraft seat comprising a seat back according to claim 1.

11. An aircraft comprising at least one seat according to claim 10.

* * * * *